United States Patent [19]

Yanagihara et al.

[11] Patent Number: 5,039,027
[45] Date of Patent: Aug. 13, 1991

[54] METHOD FOR CONTROL OF TAPE TENSION BETWEEN THE REELS AND APPARATUS THEREFOR

[75] Inventors: Norihisa Yanagihara; Katsuo Ooki, both of Ibaraki; Takao Terayama, Ushiku; Masanori Arahori, Kodaira, all of Japan

[73] Assignee: Hitachi, Ltd., Tokyo, Japan

[21] Appl. No.: 430,008

[22] Filed: Nov. 1, 1989

[30] Foreign Application Priority Data

Nov. 4, 1988 [JP] Japan .................. 63-278824

[51] Int. Cl.$^5$ .......................... B65H 59/38
[52] U.S. Cl. ..................... 242/190; 242/75.51; 318/7
[58] Field of Search ............ 242/187, 190, 75.51, 242/75.52; 360/71; 318/7

[56] References Cited

U.S. PATENT DOCUMENTS

| | | | |
|---|---|---|---|
| 3,606,201 | 9/1971 | Petusky | 242/190 |
| 3,809,335 | 5/1974 | Mantey | 242/190 X |
| 3,829,038 | 8/1974 | Studer | 242/190 |
| 4,442,985 | 4/1984 | Kishi et al. | 242/75.51 X |
| 4,525,654 | 6/1985 | Tajima et al. | 318/7 |
| 4,743,811 | 5/1988 | Katayama | 242/75.51 X |

FOREIGN PATENT DOCUMENTS

56-127957 10/1981 Japan .

Primary Examiner—Daniel P. Stodola
Assistant Examiner—William G. Battista, Jr.
Attorney, Agent, or Firm—Antonelli, Terry, Stout & Kraus

[57] ABSTRACT

This invention relates to tape tension control in a device which has a capstan disposed between a supply reel and which transport a tape wound around the supply reel to the take-up reel. While the tape, mounted on the reels, is running, the tape speed is varied greatly, and during this speed change period, a tape tension variation between the supply reel and the capstan and a tape tension variation between the capstan and the take-up reel are found. From those tape tension variations, ratios of moments of inertia of the reels with the tape thereon to the tape radii are found, and according to the values of the ratios, the gains of the loops of the tension control system is adjusted.

8 Claims, 6 Drawing Sheets

METHOD FOR CONTROL OF TAPE TENSION BETWEEN THE REELS AND APPARATUS THEREFOR

BACKGROUND OF THE INVENTION

1. Field of the Invention

This invention relates to control of the reels of a recording and reproducing device which drives a tape by a capstan and more particularly to optimal control of tape tension between the reels by detecting moments of inertia of the reels.

2. Description of Related Art

For control of the reels of a magnetic recording and reproducing device, it is required to move a magnetic tape at constant speed and tension. Therefore, it is necessary to control the reels according to the moments of inertia of the reels including the tape thereon by taking into consideration diameters of the wound tape on the reels, which change every moment as the tape runs.

In prior art devices as disclosed in Japanese Patent Application Laid-Open No. 56-127957, the tape radii on the reels are detected, and then, a moment of inertia of only the tape on each reel is found, and also a moment of inertia of each reel including the tape thereon is obtained by adding a fixed value corresponding to a moment of inertia of the empty reel to the moment of inertia of only the tape on the reel. The reels are controlled according to the thus obtained moments of inertia of the reels with the tape thereon.

In the above-mentioned prior art, when there are various kinds of reels usable with the device and the moments of inertia of individual reels differ depending on their types, the moments of inertia of the reels cannot be detected accurately, resulting in a great fluctuation in tape tension and making it impossible to run a tape stably. For a VTR using a 1-inch-wide tape for broadcast, for example, there are so large a variety of reels loadable on the VTR, ranging from 6.5 to 14 inches in diameter that the greatest difference in the moment of inertia among the reels is as large as more than twenty times. FIG. 2 is a graph showing the moment of inertia of reel including a tape thereon versus tape radius. It will be understood that when the diameter of a wound tape is small (say, so small as to be close to the minimum diameter $r_0$), it is difficult to accurately find a moment of inertia of a reel with a tape thereon from the tape radius.

SUMMARY OF THE INVENTION

An object of this invention is to provide a method of controlling the tape tension between reels and an apparatus therefor which are capable of detecting moments of inertia of the reels with a tape thereon regardless of the kind of reel and always performing optimal control of tape tension with a tension control apparatus having fixed characteristics, thereby enabling the tape to run stably.

According to one aspect of this invention to achieve the object of the invention, a method for controlling the tape tension, wherein a capstan is disposed between a supply reel and a take-up reel, and wherein reel motors to drive these reels respectively and a capstan motor to drive the capstan are controlled such that a tape is moved from the supply reel to the take-up reel with the tape tension kept at a predetermined value, comprises the steps of:

changing the tape speed by controlling the capstan motor;

finding a tension variation of the tape between the supply reel and the capstan and a tension variation of the tape between the capstan and the take-up reel, said tension variations being caused by a change in tape speed during a speed change period of the tape;

finding, from those two tape tension variations, a ratio of a moment of inertia of the supply reel with the tape thereon to the tape radius on the supply reel and a ratio of a moment of inertia of the take-up reel with the tape thereon to the tape radius on the take-up reel; and adjusting gains of tension control loops at the respective reels on the basis of values of the ratios of the moments of inertia of the reels with the tape thereon to the tape radii on the reels.

According to another aspect of this invention, which has been made in order to achieve the above-mentioned object, in a tape tension control apparatus for a tape driving device including a capstan to move the tape, a motor to drive the capstan, a capstan speed control section to control the motor to drive the capstan, a tape supply reel, a motor to drive the tape supply reel, a tape take-up reel, a motor to drive the tape take-up reel, a tape speed detecting means for detecting the speed of the tape fed by the capstan, tension detecting means for detecting tape tension on the supply side and the take-up side, tape radius detecting means for detecting tape radii on the tape supply reel and the tape take-up reel, and reel control sections to control rotating speeds of the tape supply reel and the tape take-up reel through the control of the tape supply reel drive motor and the tape take-up reel drive motor and to detect the tape tension on the supply side and the take-up side, wherein said control of the reel rotating speed and the tape tension is performed according to detection signals from said detecting means, the tape tension control apparatus comprises:

means for detecting variations in tape tension on the supply side and the take-up side by use of said tape tension detecting means when a tape feed speed by the capstan is changed by varying a capstan rotating speed;

means for calculating a moment of inertia of the supply reel with the tape mounted thereon and a moment of inertia of the take-up reel with the tape mounted thereon on the basis of the detected variations in tape tension and the detection signals from said tape radius detecting means; and gain adjusting means for adjusting the gain of the tension control system of said reel control section according to the detected moments of inertia of the respective reels with the tape thereon and the tape radii detected by said tape radius detecting means.

Other and further objects and features of this invention will become apparent from the following description.

DESCRIPTION OF THE PREFERRED EMBODIMENTS

Figure 1:
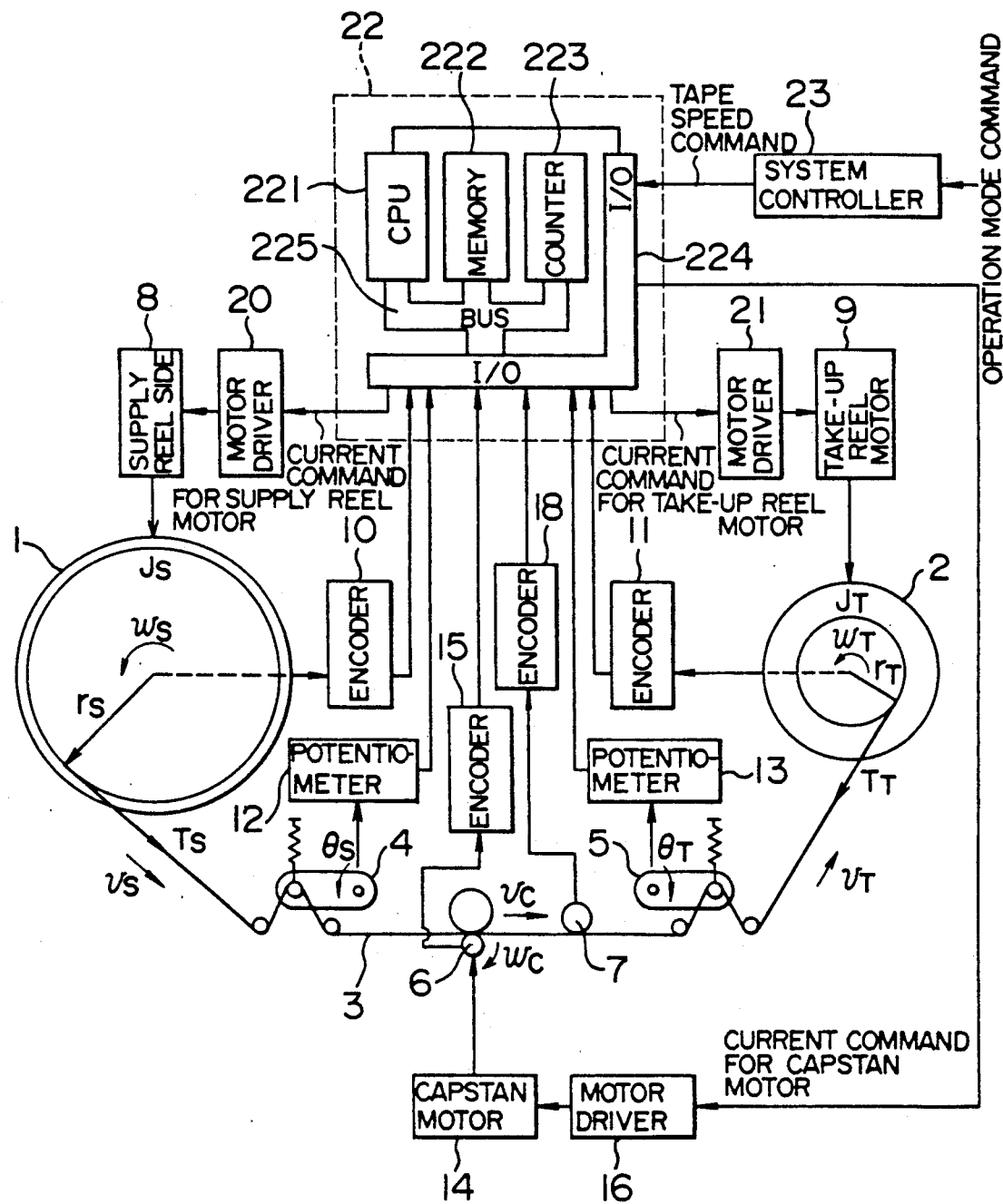
FIG. 1 is a block diagram of an embodiment of this invention.
Figure 2:
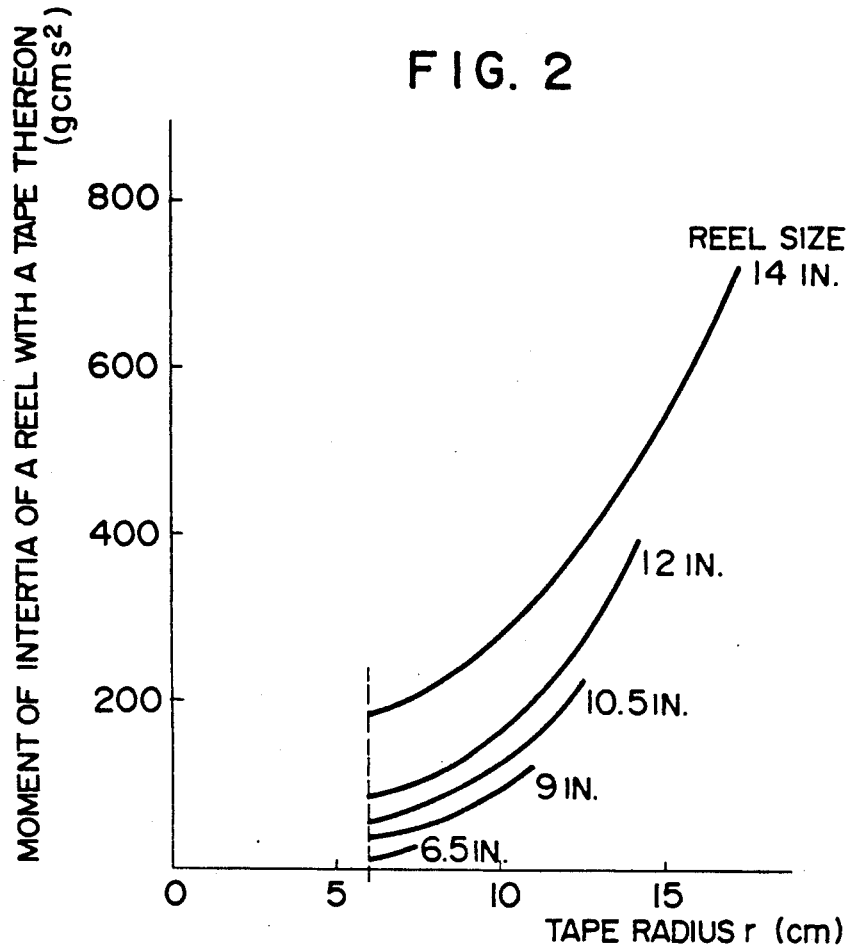
FIG. 2 is a diagram showing the relation between the tape radius and the moment of inertia of reel with a tape thereon.

This invention will be described for an embodiment applied to a magnetic tape recording and reproducing apparatus with reference to the accompanying drawings. In FIG. 1, a magnetic tape 3 is wound around a supply reel 1, and the tape 3 is moved by a capstan 6 toward a take-up reel 2.

A tension arm 4 detects the tension applied to the magnetic tape 3 between the supply reel 1 and the capstan 6. A tension arm 5 detects the tension applied to the magnetic tape between the take-up reel 2 and the capstan 6. The roller 7, which detects the tape speed, is mounted in such a manner that the roller 7 rotates while keeping in contact with the tape 3. Reel motors 8 and 9 drive the reels 1 and 2. Encoders 10 and 11 output pulses according to the amount of rotation of the reels. Potentiometers 12 and 13 output voltages according to their pivoting angles that vary with the change in tension of the tension arms 4 and 5. The tension arms and the potentiometers constitute a tension detector. A capstan motor 14 drives the capstan 6. An encoder 15 outputs pulses at a frequency proportional to the rotating speed of the capstan 6. A motor driver 16 supplies a drive current to the motor 14 in response to a capstan motor current command output by a controller 23. An encoder 18 outputs pulses according to the amount of rotation of the roller 7. Motor drivers 20 and 21 supply drive current to the motors 8 and 9 in response to current commands for the respective reel motors output by controller 22. Each of the reel motors 8 and 9 and the capstan motor may be a brushless AC motor having the characteristics of a permanent magnet-type DC motor.

The magnetic tape 3 is supplied from the supply reel 1, passes the tension arm 4 and a head unit (not shown), runs by way of the capstan 6, the speed detecting roller 7 and the tension arm 5 and is taken up by the take-up reel 2.

A system controller 23, on receiving an operation mode command from an operation panel or some other device, selects one of predetermined operation modes, such as fast winding, rewinding, recording and reproducing modes for the unit concerned, and outputs a tape speed command in compliance with the selected mode to the controller 22.

The controller 22 receives the tape speed command from the system controller 23 and outputs current commands to the motor drivers 16, 20 and 22, respectively, to make the tape speed coincident with the speed command. The controller 22 is an ordinary microprocessor which includes a CPU 221, a memory 222, a counter 223 and an I/0 interface 224 having D/A and A/D converters, these devices of the controller 22 being interconnected by buses 225. To be more specific, the controller 22 has stored in the memory 222 a control program by which to execute operations to be described later. According to the control program, the CPU processes input signals (from the encoders 10, 11, 15, 18, the potentiometers 12, 13), calculates and outputs current commands to the motor drivers 16, 20 and 21.

Before describing the operation of the embodiment of FIG. 1, mention should be made of a case where the tape is moved by a capstan as shown in FIG. 1.

So, description is made of an operation in which the magnetic tape 3 is fed by the capstan at a constant speed from the supply reel 1 to the take-up reel 2.

On receiving a tape speed command from the system controller 23, the controller 22 outputs a capstan motor current command to the motor driver 16 to control the capstan rotation angular speed $\omega_C$ so that the tape feed speed $V_C$ by the capstan agrees with the specified tape speed Vf. If the radius of the capstan shaft is denoted by $r_C$, the following relationship holds between $V_C$ and $\omega_C$.

$$V_C = r_C \omega_C \quad (1)$$

The angular speed $\omega_C$ of the capstan 6 is detected by the encoder 15 attached to the capstan shaft. A period of a pulse of the encoder is detected by the counter 222 in the controller 22, and from the detected period, the angular speed $\omega_C$ of the capstan is calculated. (Refer to the equation (16).) Using the equation (1), the tape speed $V_C$ is obtained from the capstan angular speed $\omega_C$, and the tape speed $V_C$ is compared with the tape speed command value to find a speed error. From the speed error that is found, a capstan motor current command value is calculated, and the calculated current command value is output to the motor driver 16, thereby controlling the angular speed $\omega_C$ of the capstan motor 14. When the actual tape speed is less than the command value, the current command value is increased, accelerating the capstan motor and therefore increasing the tape speed. On the other hand, when the actual tape speed exceeds the command value, the current command value is decreased, thereby decelerating the capstan motor and decreasing the tape speed.

In this process, the rotating speeds $\omega_S$ and $\omega_T$ of the supply reel 1 and the take-up reel 2 are controlled such that the tension arms 4 and 5 are positioned at the respective target values. This operation is described with regard to the take-up reel 2.

When the take-up reel 2 is rotating at the angular speed of $\omega_T$, if the tape radius on the reel is denoted by $r_T$, the magnetic tape 3 is taken up at the speed as shown.

$$V_T = r_T \omega_T \quad (2)$$

If the value of $V_c$ is higher than the capstan tape feed speed $V_T$, the magnetic tape 3 is pulled, thus increasing the tape tension $T_T$ on the take-up side and increasing the angle $\theta_T$ of the tension arm 5. This angular displacement is converted by the potentiometer 13 into a change in voltage, which is input to the controller 22. The angle of the tension arm 5 input to the controller 22 is compared with the target angle, and from an error thus found, a current command is calculated and output to the motor driver 21. When the angle $\theta_T$ of the tension arm 5 is larger than the target angle, a reduced current command value is output, thereby decreasing the current of the reel motor 9 and decreasing the angular speed $\omega_T$ of the take-up reel and, hence, the tape tension $T_T$.

When the tape speed $V_T$ of the take-up reel is lower than the tape feed speed $V_C$ of the capstan so that the tape tension $T_T$ is decreased, control is effected, conversely, to increase the tape tension $T_T$ by increasing $\omega_T$. In other words, in the reel control system, the angular speed $\omega_T$ of the take-up reel is controlled so that the angle $\omega_T$ of the tension arm 5 and, hence, the tape tension $T_T$ are kept at predetermined values thereby achieving $V_T = V_C$.

Similar control is exercised also for the supply reel, and the angular speed $\omega_S$ of the supply reel is controlled so that the tape tension $T_S$ on the supply side coincides with a predetermined value.

In the meantime, the control of the tape tension as described above is affected by the moments of inertia of the supply and take-up reels, each having tape thereon. Therefore, in order to compensate for said effects, in this embodiment of the invention, a moment of inertia is calculated for each reel, and according to the calculated moments of inertia, the gain of the tape tension control system is adjusted. Also, the currents supplied to the motors for the respective reels are corrected accordingly.

Using the flowcharts of FIGS. 8 and 9, the operation of the embodiment shown in FIG. 1 will next be described.

Figure 8:
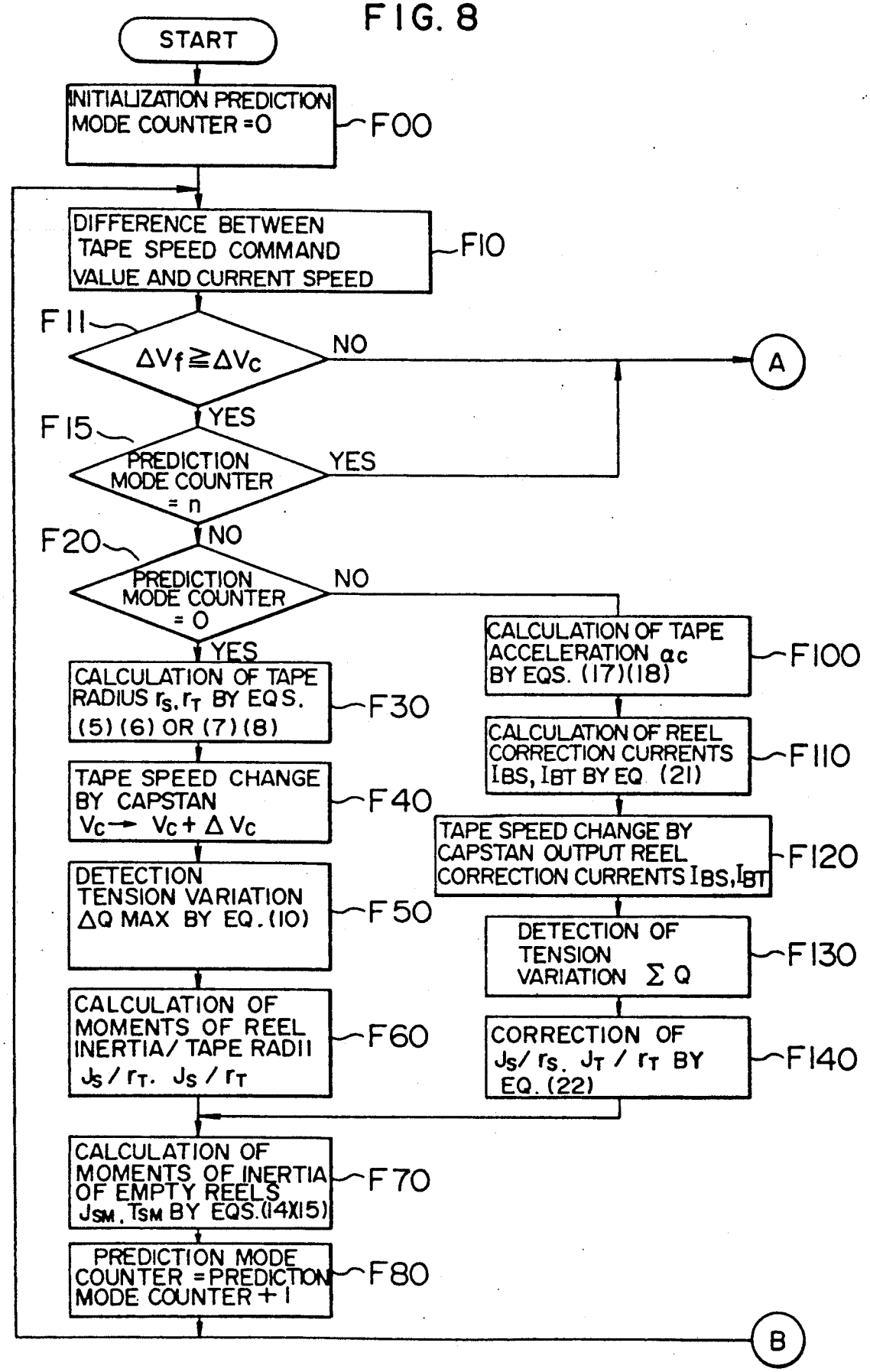
FIGS. 8 and 9 are flowcharts showing the operation in the controller.
Figure 9:
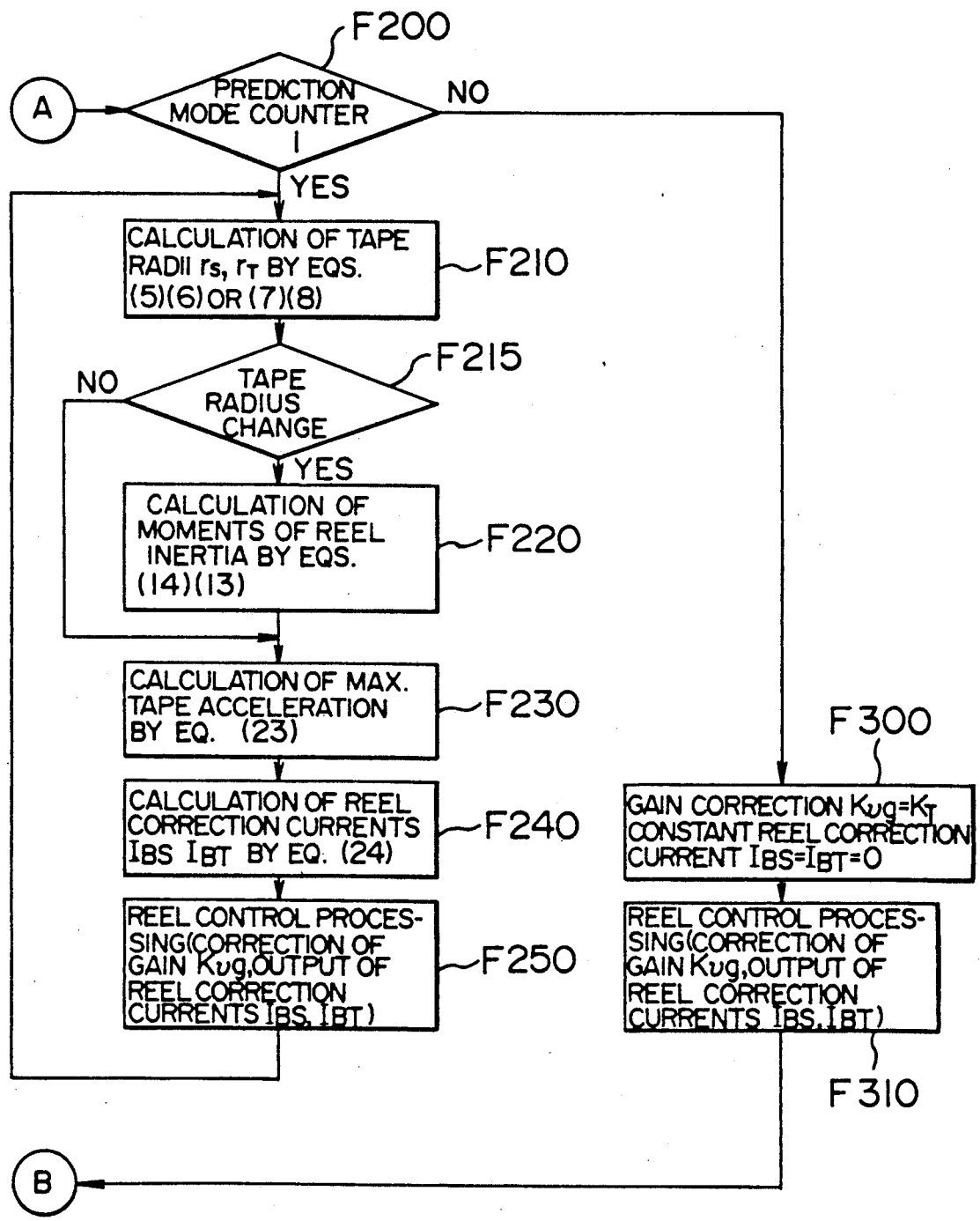

Referring to FIG. 8, in the case of NO at the step F11 or in the case of YES at the step F15, the process proceeds to the step 200 of FIG. 9. After the step 310 of FIG. 9 has been done, the process returns to the step 10 of FIG. 8.

The operation starts with the processing of the step F00 of FIG. 8. This step is to set the initial value of 0 on a prediction mode counter which may be an addressible area in the memory 222.

Then, the process moves on to the step F10. A command value of tape speed from the system controller 23 is input into the controller 22. This tape speed command value Vf is compared with the current tape speed $V_C$ and a speed difference $\Delta Vf$ is found as follows:

$$\Delta Vf = Vf - V_C \tag{3}$$

The process then proceeds to the step F11. If the speed difference $\Delta Vf$ found in the step 10 meets the following condition with respect to a predetermined value $\Delta V_C$ of the capstan tape speed variation, $$\Delta Vf > \Delta V_C \tag{4}$$

then, the process moves on to the step F15.

If the condition of the equation (4) is not met, the process proceeds to the step F200 of FIG. 9.

At the step F15, if the prediction mode counter has a value larger than a preset value n, where n is an integer equal to or larger than 0, the process proceeds to the step F200 of FIG. 9. Initially, the prediction mode counter has 0 and at the step F20, the inertia prediction mode is put into effect.

At the step F20, if the prediction mode counter has a value or to or larger than 1, the process proceeds to the step F100, or if that value is 0, the process advances to the step F30.

At the step F30, the radii $r_S$ and $r_T$ of the tapes wound on the respective reels are found.

As is well known, the tape radii $r_S$ and $r_T$ can be obtained from a ratio between tape speed and reel rotating speed.

$$\begin{aligned} V_C = V_S = r_S \omega_S, & \quad r_S = V_C/\omega_S \\ V_C = V_T = r_T \omega_T, & \quad r_T = V_C/\omega_T \end{aligned} \tag{5}$$

Information about the tape speed $V_C$ is detected by the encoder 18 attached to the roller for detecting the tape speed, and information about the rotating speeds $\omega_S$ and $\omega_T$ of the respective reels are detected by the enclosers 10 and 11 attached to the reel shafts. Pulses produced by each the encoders are used as a gate control signal for gating high frequency clock pulses applied to an associated counter unit provided to the counter 222 in the controller 22. The intervals of the pulses are counted by the high frequency clock pulses (period: $t\phi$). The system clock to actuate the CPU 221 in the controller 22 may be used for producing the high frequency clock pulses. If the counts of the counter units are denoted by $n_r$, $n_S$ and $n_T$, the numbers of pulses for one revolution of each encoder by $n_{rP}$, $n_{SP}$ and $n_{TP}$, and the timer roller radius by $r_r$, we have:

$$\begin{aligned} V_C = r_r \omega_r = r_r \frac{2\pi}{n_{rP}} \frac{1}{t\phi n_r} \\ \omega_S = \frac{2\pi}{n_{SP}} \frac{1}{t\phi n_S} \\ \omega_T = \frac{2\pi}{n_{TP}} \frac{1}{t\phi n_T} \end{aligned} \tag{6}$$

The $r_S$ and $r_T$ are found from the $\omega_S$ and $\omega_T$ of this equation by using the equation (5).

The $r_S$ and $r_T$ may be obtained by integrating the equation (5). To be more specific, the $r_S$ and $r_T$ are obtained from a tape feed amount $X_C$ and angles of rotation $\beta_S$ and $\beta_T$ of the reels as shown below.

$$\begin{aligned} X_C = r_S \beta_S, & \quad r_S + X_C/\beta_S \\ X_C = r_T \beta_T, & \quad r_T + X_C/\beta_T \end{aligned} \tag{7}$$

The tape feed amount $X_C$ is detected by the encoder 18 attached to the tape speed detecting roller 7, and the angles of rotation $\beta_S$ and $\beta_T$ of the reels are detected by the encoders 10 and 11 attached to the reel shafts. The pulses of the encoders are input into the counter 222 in the controller 22, and the numbers of pulses in a certain period of time are counted. If the counts of the counters are denoted by $n_r$, $n_S$ and $n_T$, we have:

$$\begin{aligned} X_C = r_r \frac{2\pi}{n_{rP}} n_r \\ \beta_S = \frac{2\pi}{n_{SP}} n_S \\ \beta_T = \frac{2\pi}{n_{TP}} n_T \end{aligned} \tag{8}$$

By substituting $\beta_X$, $\beta_T$, and $X_C$, obtained from the equation (8), into the equation (7), the $r_S$ and $r_T$ are found.

In the two methods described above, the encoder 18 attached to the timer roller 7 is used. However, also by using the encoder 15 attached to the capstan 6, it is possible to detect the tape speed and the tape feed amount, and find the $r_S$ and $r_T$.

At the step F40, the tape speed is changed by $\Delta V_C$ from $V_C$ to $V_C+\Delta V_C$. A capstan tape speed command $V_R(=V_C+\Delta V_C)$ corresponding to the tape speed command Vf from the system controller 22 is obtained by the controller 22 and an error signal is determined as a difference between the capstan tape speed command $V_R$ and the tape speed $V_C$, is obtained. From this error signal, a capstan motor current command is calculated and the current command is output to the motor driver 16. As a result, the capstan motor is accelerated and the tape speed becomes $V_C+\Delta V_C$.

Figure 3:
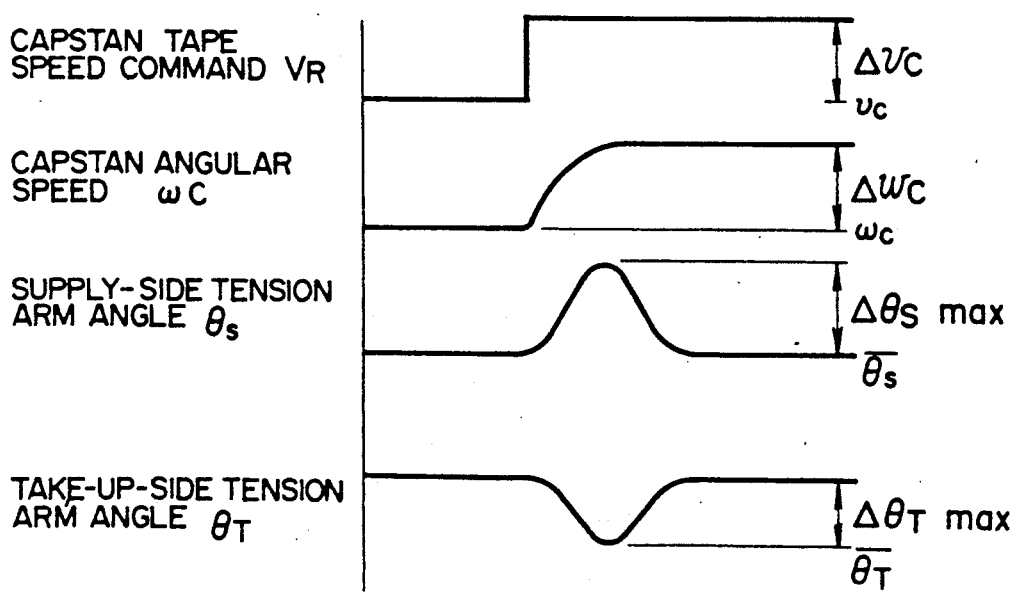
FIG. 3 is a response waveform diagram of the capstan speed and the tension variation when the tape speed is varied.

FIG. 3 shows the response waveforms of various kinds when a tape speed command is varied by $\Delta V_C$ in a stepped form. In FIG. 3, the tension variation is expressed by the tension arm angles $\theta_S$ and $\theta_T$. The capstan angular speed $\omega_C$ changes according to a change in this speed command as illustrated. On the supply reel side, a change in the capstan tape feed speed $V_C$ causes a change that $V_S<V_C$, thereby increasing the tape tension $T_S$. On the take-up side, a change $V_T<V_C$ results, decreasing the tape tension $T_T$. By the working of the tension control system, the angular speeds $\omega_S$ and $\omega_T$ of the reels finally increase as shown below and the tension returns to a fixed value.

$$\left. \begin{array}{l} \Delta\omega_S = \Delta V_C/r_S \\ \Delta\omega_T = \Delta V_C/r_T \end{array} \right\} \quad (9)$$

At the step F50, a tension variation that has occurred in the step F40 is detected. The angle signals $\theta_S$ and $\theta_T$ of the tension arms are input in the form of voltage signals from the potentiometers 12 and 13 into the controller 22. In the controller 22, the I/0 interface 224 converts the signals from analog form into digital form and stores them in the memory one after another. Data before the tape speed has been changed by the capstan is averaged to obtain mean values $\theta_S$ and $\theta_T$. From the data of $\theta_S$ and $\theta_T$ after the change in the tape speed, variations $\Delta\theta_S$ and $\Delta\theta_T$ are obtained as follows:

$$\left. \begin{array}{l} \Delta\theta_S = \theta_S - \theta_S \\ \Delta\theta_T = \theta_T - \theta_T \end{array} \right\} \quad (10)$$

The $\Delta\theta_X$ and $\Delta\theta_T$ are stored in the memory and compared one by one to obtain the maximum variations $\Delta\theta_{SMAX}$ and $\Delta\theta_{TMAX}$.

At the step F60, from the maximum tension variations and $\Delta\theta_{TMAX}$, ratios $J_S/r_S$ and $J_T/r_T$ of the moments of inertia of the reels with the tape thereon to the tape radii are found.

The tension variation on changing the tape speed differs with different moments of inertia of the reels with the tape thereon and with different radii of the tape on the reels. A greater moment of inertia results in a slower response of the reel angular speed and a larger tension variation. A smaller tape radius produces a larger change in the angular speed according to the equation (9), resulting in a slower response and a larger variation in the tape tension. That is to say, apparently, the tension variation is proportional to the moment of inertia of the reel with the tape thereon and is inversely proportional to the tape radius.

Figure 4:
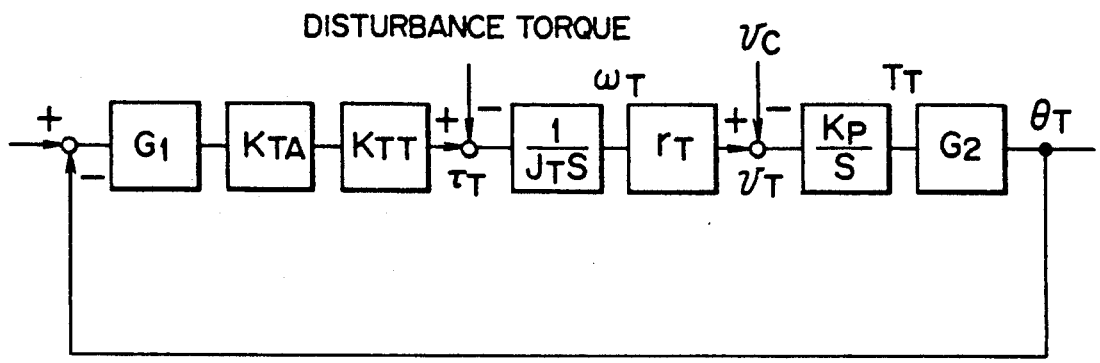
FIG. 4 is a block diagram of the tension control system.

This will be described with reference to the block diagram in FIG. 4, which shows the tension control system on the take-up side as an example. If the transfer function of a correction element is denoted by $G_1(S)$, the gain of a motor driver by $K_{TA}$, the motor torque constant by $K_{TT}$, the modulus of elasticity of the tape running system by $K_P$, and the tension arm transfer function by $G_2(S)$, then the open-loop transfer function G(S) of the tension control system is expressed by the equation (11) as follows.

$$G(S) = K_{TA}K_{TT}K_P G_1 G_2 \frac{1}{S^2} \frac{r_T}{J_T} \quad (11)$$

Therefore, it is evident that the open-loop transfer function of the tension control system on the take-up side changes with changes in the moment of inertia $J_T$ of the take-up reel and the tape radius $r_T$.

The foregoing applies to the supply reel side, too.

Figure 5:
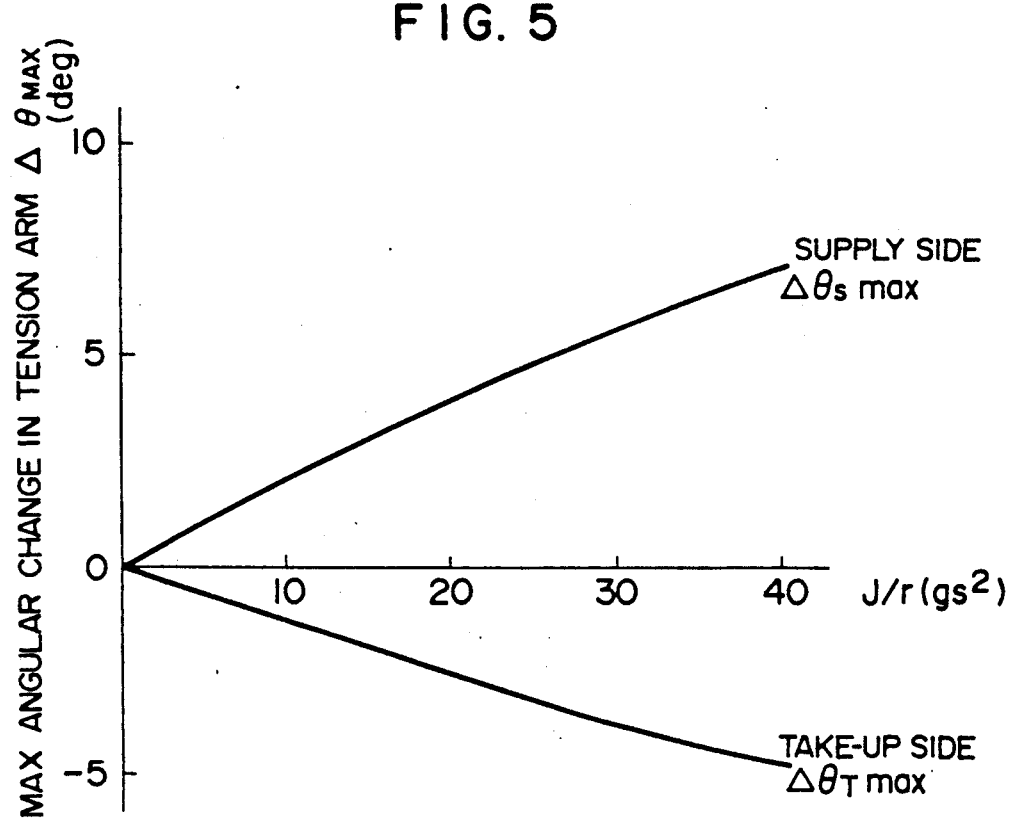
FIG. 5 is a graph showing the relation between the tension variation and the ratio of the moment of inertia of reel with the tape thereon to the tape radius.

FIG. 5 shows the maximum values of the changes in the tension arm angles $\theta_S$ and $\theta_T$ when the tape speed is changed by $\Delta V_C=24.4$ cm/s by using the ratio $J_S/r_S$ of the moment of inertia of the reel with the tape thereon to the tape radius on the supply side and the similar ratio $J_T/r_T$ on the take-up side as parameters.

This figure indicates that the maximum value of the angular displacement is virtually proportional to the $J_S/r_S$ and $J_T/r_T$. The reason why the maximum value differs between on the supply side and on the take-up side is because the modulus of elasticity $K_P$ of the tape running system and the tension arm transfer function $G_2(S)$ differ between the two sides. Therefore, by measuring the tension arm angular changes on the supply side and the take-up side, it is possible to find the $J_S/r_S$ on the supply side and the $J_T/r_T$ on the take-up side from the respective graphs for the supply side and the take-up side in FIG. 5.

In the arithmetic operation in the controller 22, the relation between $\Delta\theta_{MAX}$ and J/r is found by approximation by a linear expression in FIG. 5 as shown in the equation (12).

$$\left. \begin{array}{l} J_S/r_S = K_S \Delta\theta_{SMAX} \\ J_T/r_T = K_T \Delta\theta_{TMAX} \end{array} \right\} \quad (12)$$

where $K_S$ and $K_T$ are proportional constants.

That is to say, said relation is obtained by multiplying the tension arm maximum variations $\Delta\theta_{SMAX}$ and $\Delta\theta_{TMAX}$ by the proportional constants $K_S$ and $K_T$.

If you have the memory store the relation of FIG. 5 in the form of a table, it is possible to find $J_S/r_S$ and $J_T/r_T$ by referring to the table from the values of the $\Delta\theta_{SMAX}$ and $\Delta\theta_{TMAX}$.

At the step F70, from the ratios of the moments of inertia of the reels with the tape thereon to the tape radii and the tape radii, the moments of inertia of the empty reels are obtained.

By multiplying the tape radii $r_S$ and $r_T$ by the ratios $J_S/r_S$ and $J_T/r_T$ of the moments of inertia of the reels with the tape thereon to the tape radii, the moments of inertia $J_S$ and $J_T$ of the respective reels are found.

The moments of inertia $J_S$ and $J_T$ of the reels with the tape thereon are expressed by the sums of the moments of inertia $J_{SM}$ and $J_{TM}$ of the empty reels and the moments of inertia $J_{ST}$ and $J_{TT}$ of the tape on the reels as shown below.

$$J_S = J_{SM} + J_{ST} \brace J_T = J_{TM} + J_{TT}} \quad (13)$$

The moments of inertia $J_{ST}$ and $J_{TT}$ of the tape only are:

$$J_{ST} = \frac{\pi \gamma h}{2g}(r_S^4 - R_0^4) \brace J_{TT} = \frac{\pi \gamma h}{2g}(r_T^4 - R_0^4)} \quad (14)$$

where:
g: gravitational acceleration
γ: tape density
h: tape width
R$_0$: reel hub radius If the tape radii $r_S$ and $r_T$ are known, the moments of inertia $J_{ST}$ and $J_{TT}$ of the tape can be calculated by using the equation (14).

The relation between the tape radius and the moment of inertia of the tape in the equation (14) are common to the supply side and the take-up side. If the relation between the tape radius and the moment of inertia of the tape is stored in the memory in the form of a table, it is also possible to find moments of inertia of the tape for the respective reels through the tape radii by referring to the table.

If the moments of inertia $J_S$ and $J_T$ of the reels with the tape thereon and the moments of inertia $J_{ST}$ and $J_{TT}$ of the tape are known, the moments of inertia $J_{SM}$ and $J_{TM}$ of the empty reels can be found by the following equation (15).

$$J_{SM} = J_S - J_{ST} \brace J_{TM} = J_T - J_{TT}} \quad (15)$$

The reason why the moments of inertia of the empty reels are found at this step is to make it easy to obtain the moments of inertia of the reels with the tape thereon after a change in the tape radius. The method will be described from the step F200 on in FIG. 9.

At the step F80, 1 is added to the value of the prediction mode counter. Initially, the prediction mode counter has 0. The value is increased to 1 when the inertia prediction mode is executed. Then, the process returns to the step F10 and judgments are made of the inertia prediction mode of the steps F11 and F15. When the condition of equation (4) at the step F11 is satisfied, the prediction mode counter has 1, and the process advances to the step F100.

At the step F100, from the speed response in the tape speed change by the capstan at the step F40, a tape acceleration is found. Since the capstan angular speed $\omega_C$ increases as shown in FIG. 3, a mean acceleration is obtained. The capstan angular speed $\omega_C$ can be obtained by inputting as gate signals pulses of the encoder 15 attached to the capstan 6 into the counter in the controller and counting the pulse intervals by the high frequency clock (period: t$\phi$). If the count of the counter is denoted by n$_C$ and the number of pulses for one revolution of the encoder by n$_{CP}$, the capstan angular speed can be obtained by the following equation.

$$\omega_C = (2\pi/n_{CP})/(t\phi n_C) \quad (16)$$

The time $t_C$ in which the capstan angular speed $\omega_C$ reaches $\omega_C + 0.9 \Delta\omega_C$ from $\omega_C + 0.1 \Delta\omega_C$ is obtained by the counter in the controller and stored in the memory. Therefore, the capstan acceleration can be obtained as follows.

$$\frac{d\omega_C}{dt} = 0.8 \Delta\omega_C/t_C \quad (17)$$

Accordingly, since the capstan shaft radius is $r_C$, the mean tape acceleration $\alpha_C$ can be obtained by the equation (18) as follows.

$$\alpha_C = r_C \frac{d\omega_C}{dt} = 0.8 \Delta V_C/t_C \quad (18)$$

At the step F110, reel motor correction currents $I_{BS}$ and $I_{BT}$ when the tape speed is being changed by the capstan is obtained. If the tape acceleration of the reels is denoted by $\alpha_S$ and $\alpha_T$, we have:

$$\alpha_S = r_S \frac{d\omega_S}{dt} \brace \alpha_T = r_T \frac{d\omega_T}{dt}} \quad (19)$$

If the reel motor currents are denoted by $I_S$ and $I_T$, then:

$$J_S \frac{d\omega_S}{dt} = K_{ST} I_S \brace J_T \frac{d\omega_T}{dt} = K_{TT} I_T} \quad (20)$$

Thus, the respective reels are accelerated by the motor currents $I_S$ and $I_T$, where $K_{ST}$ and $K_{TT}$ are the torque constants of the reels motors. Now, from the equations (20) and (19), currents $I_{BS}$ and $I_{BT}$ are obtained such that the acceleration of the respective reels is $\alpha_C$.

$$I_{BS} = \frac{1}{K_{ST}} \alpha_C \frac{J_S}{r_S} \brace I_{BT} = \frac{1}{K_{TT}} \alpha_C \frac{J_T}{r_T}} \quad (21)$$

That is to say, if the currents $I_{BS}$ and $I_{BT}$ are supplied to the reels, it follows that the reels increase in speed with the same acceleration as the acceleration $\alpha_C$ of the tape by the capstan.

At the step F120, as in the step F40, the tape speed by the capstan is changed by $\Delta V_C$, and at the same time, current commands added with the correction currents $I_{BS}$ and $I_{BT}$, obtained at the step F110, are output to the motor drivers 20 and 21.

Consequently, the tape acceleration by the capstan becomes substantially coincident with the tape acceleration by the reels, thus making the tension variation far less than in the step F40 of FIG. 3.

At the step F130, the tension variation that has occurred in the step F120 is obtained. Since the tension variation at this time is very small, it is obtained by integrating the tension variation $\Delta\theta$ ($=\theta-\theta$) by time. By finding the $\Delta\theta_S$ and $\Delta\theta_T$ as in the step F50 and adding them one after another, integrated values $\Sigma\Delta\theta_S$ and $\Sigma\Delta\theta_T$ of the tension variation are obtained.

At the step F140, according to the integrated values $\Sigma\Delta\theta_S$ and $\Sigma\Delta\theta_T$ of the tension variation, the ratios $J_S/r_S$ and $J_T/r_T$ of the moments of inertia of the reels with the tape thereon to the tape radii are corrected.

$$J_S/r_S = J_S/r_S + K_{JRS}\Sigma\Delta\theta_S (J_S/r_S) \atop J_T/r_T = J_T/r_T + K_{JRT}\Sigma\Delta\theta_T (J_T/r_T) \Biggr\}\quad(22)$$

where $K_{JRS}$, $K_{JRT}$: proportional constants

Hereafter, the process advances to the step F70, where from the ratios of the corrected moments of inertia of the reels with the tape thereon to the tape radii, the moments of inertia of the simple reels are obtained, and at the step F80, 1 is added to the value of the prediction mode counter. Then, the process returns to the step F10.

At the steps F11 and F15, judgment is made whether to enter the inertia prediction mode. If it is possible to enter the inertia prediction mode further, the processes from the step F100 on are repeated. In FIG. 8, the number of times is put at a maximum of n times at the step F15. In actuality, n=3 is used.

Cases where judgment is made not to enter the inertia prediction mode, that is, a case where the condition of the equation (4) is not satisfied at the step F11 and a case where the value of the prediction mode counter is n at the step F15 will be described.

At the step F200 in FIG. 9, if the value of the prediction mode counter is equal to or greater than 1, that is, if the prediction mode has ended, the process proceeds to the step F210.

At the step F210, an arithmetic operation of the tape radii $r_S$ and $r_T$ as in the step F30 is performed. If the tape radii remain unchanged, such a judgment is made at the step F215, and the process advances to the step F230.

If the tape radii are found to have changed, the moments of inertia of the reels with the tape thereon are obtained again at the step F220. From the tape radii $r_S$ and $r_T$, the moments of inertia $J_{ST}$ and $J_{TT}$ of the tape are obtained by using the equation (14), and by performing additions as in the equation (13), the moments of inertia $J_S$ and $J_T$ of the reels with the tape thereon can be obtained.

The process next proceeds to the step F230. At the step F230, from the moments of inertia $J_S$ and $J_T$ of the reels with the tape thereon and the tape radii $r_S$ and $r_T$, the maximum acceleration $\alpha_0$ of the tape is obtained. According to the limitation of the capacity of the reel motor drivers or the maximum rating of the reel motor current, the maximum currents for the respective reel motors are designated as $I_{SMAX}$ and $I_{TMAX}$. The maximum tape acceleration $\alpha_{SMAX}$ and $\alpha_{TMAX}$ of the respective reels satisfy the relation of the equation (23) as follows.

$$\frac{J_S}{r_S} \alpha_{SMAX} = K_{ST} I_{SMAX} + r_S T_S \atop \frac{J_T}{r_T} \alpha_{TMAX} = K_{TT} I_{TMAX} - r_T T_T \Biggr\}\quad(23)$$

The $r_S T_S$ and $r_T T_T$ represent the load on the respective reel motors due to the tension. The tension $T_S$ and $T_T$ are obtained by converting the target angles for the respective tension arms into tension values in compliance with the table stored in the memory.

Therefore, by using the equation (23), the maximum acceleration $\alpha_{SMAX}$ and $\alpha_{TMAX}$ of the respective reels can be obtained from the $J_S/r_S$ and $J_T/r_T$. In an actual transfer of the tape, the tape speeds of the respective reels must coincide with each other and the acceleration $\alpha_S$ and $\alpha_T$ must coincide with each other. Therefore, the maximum acceleration $\alpha_0$ of the tape is the smaller of the $\alpha_{SMAX}$ and $\alpha_{TMAX}$ that have been obtained.

Then, the process advances to the step F240. At the step F240, correction currents of the respective reels are obtained which are required to speed up the tape with the maximum acceleration $\alpha_0$. If currents required to accelerate the tape with acceleration $\alpha_0$ from the condition in which the tape is running at a fixed speed are denoted as $I_{BS}$ and $I_{BT}$, the following relation holds.

$$\frac{J_S}{r_S} \alpha_0 = K_{ST} I_{BS} \atop \frac{J_T}{r_T} \alpha_0 = K_{TT} I_{BT} \Biggr\}\quad(24)$$

Thus, the reel correction currents $I_{BS}$ and $I_{BT}$ can be expressed as shown below.

$$I_{BS} = \frac{1}{K_{ST}} \alpha_0 \frac{J_S}{r_S} \atop I_{BT} = \frac{1}{K_{TT}} \alpha_0 \frac{J_T}{r_T} \Biggr\}\quad(25)$$

Therefore, by using the equation (25), the reel correction currents $I_{BS}$ and $I_{BT}$ can be obtained from the ratios $J_S/r_S$ and $J_T/r_T$ of the moments of inertia of the reels with the tape thereon to the tape radii.

The process next moves on to the step F250. At the step F250, the gain of the tension control system and the currents of the reel motors are corrected according to the ratios $J_S/r_S$ and $J_T/r_T$ of the moments of inertia of the reels with the tape thereon to the tape radii.

Description will be made of a method of keeping constant the gain of the tape tension control system according to the moments of inertia $J_S$ and $J_T$ of the reels with the tape thereon and the tape radii $r_S$ and $r_T$.

Figure 6:
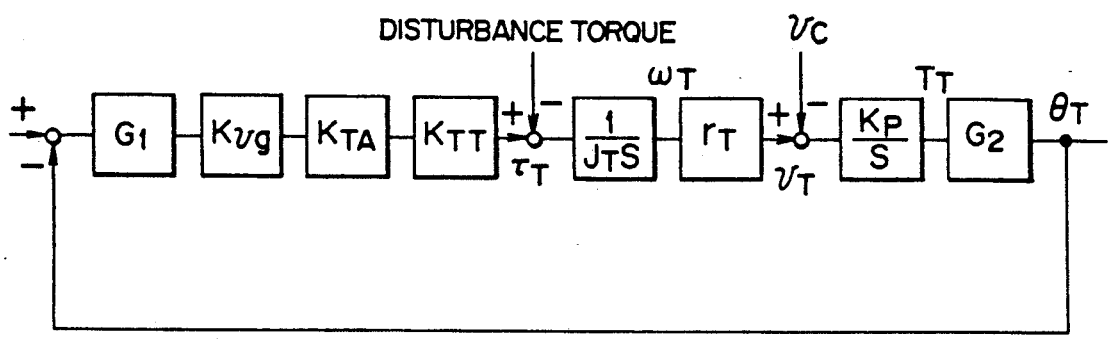
FIG. 6 is a block diagram of the tension control system wherein the correction gain Kvg is inserted.

As shown in the equation (11), the open-loop transfer function G(S) of the tension control system changes with the $r_T/J_T$. Therefore, by additionally inserting a gain of $J_T/r_T$ in the circuit as shown in the block diagram of FIG. 4, the open-loop transfer function G(S) can be kept constant regardless of the moment of inertia of the reel with the tape thereon and the tape radius. More specifically, in the controller 22, it is only necessary to add a gain of $$K_{VG}\left(=K_T\frac{J_T}{r_T}\right)$$

and multiply an error signal between the tension arm angle and its target value by the gain of $K_{VG}$. (Refer to FIG. 6.)

At this time, the open-loop transfer function G(S) is as shown below.

$$G(S)=K_T K_{TA} K_P G_1 G_2/S^2 \tag{26}$$

Figure 7:
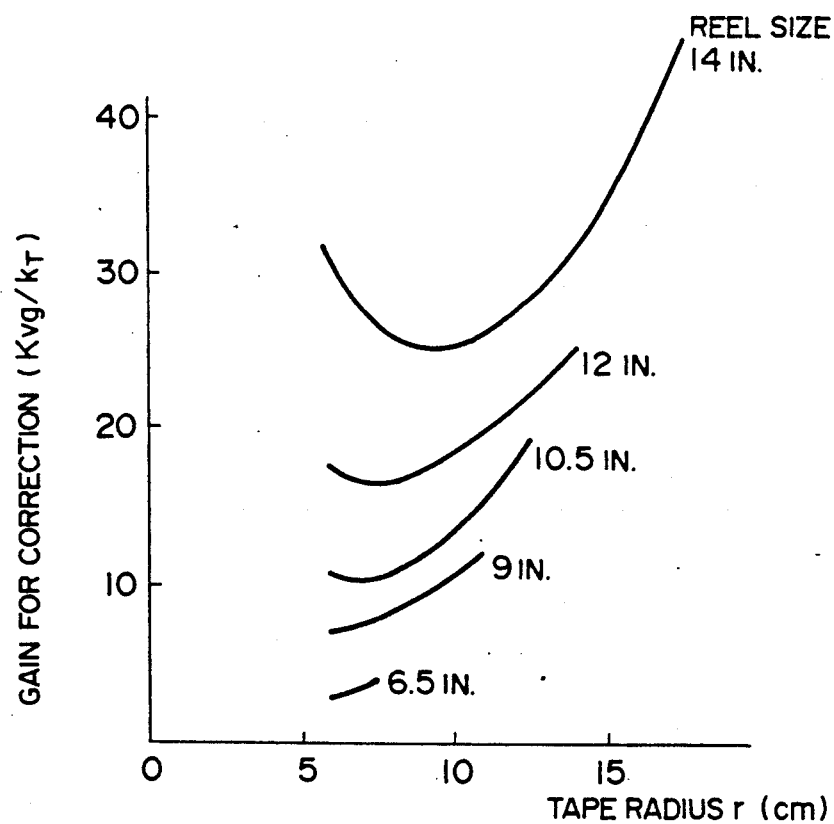
FIG. 7 is a diagram for explaining the relation between the tape radius and the correction gain Kvg.

The G(S) is constant regardless of the moment of inertia of the take-up reel with the tape thereon and the tape radius. In the above equation, $K_T$ is a gain to make the G(S) optimal. FIG. 7 shows how the correction gain $K_{VG}$ should be changed with regard to changes in the tape radius. This also applies to the supply side.

In the acceleration and deceleration of the tape, the reel drive current obtained in the step F240 is corrected. When the tape speed detected by the timer roller is compared with a speed command, if the error is larger than a fixed value, the acceleration mode or the deceleration mode is put into effect, current commands added with correction currents $I_{BS}$ and $I_{BT}$, obtained at the step F240, are output to the motor drivers 20 and 21.

In this case, the supply reel and the take-up reel accelerate or decelerate with the same acceleration, thus eliminating variations in tape tension and therefore making it possible to run the tape stably.

Description has been made of the case where the reels accelerate or decelerate with the maximum acceleration $\alpha_0$. To accelerate or decelerate the reels with acceleration $\alpha$ ($<\alpha_0$), it is only necessary to find reel correction currents $I_{BS}$ and $I_{BT}$ by using the equation (25) and supposing $\alpha_0=\alpha$ and outputting current command values added with correction currents $I_{BS}$ and $I_{BT}$ to the motor drivers 20 and 21.

If the inertia prediction modes from the step F20 onwards are executed once, thereafter the step F210 and subsequent steps are processed, in which the moments of inertia of the reels with the tape thereon are calculated according to changes in the tape radii and optimum control of the tape tension is thereby performed.

Description will now be made of a case where the prediction mode counter has 0, that is, a case where an inertia prediction mode has never been executed. If this occurs, the process proceeds to the step F300. In this case, accurate moments of inertia $J_S$ and $J_T$ of the reels with the tape thereon are not known. Therefore, the correction gain $K_{VG}=K_T$ is supposed to be constant and the reel correction currents $I_{BS}$ and $I_{BT}$ are supposed to be 0, and no correction is performed. After this, the process returns to the step F10, and if the conditions of the steps F11 and F15 are satisfied, the inertia prediction mode is put into effect, in which mode the moments of inertia of the reels with the tape thereon are detected.

In the above-mentioned embodiment, the tension detectors are provided between the capstan and each of the supply reel and the take-up reel. However, the present invention is applied also to another embodiment where the tension detector is provided between the capstan and only one of the supply and take-up reels. For example, when the tension detector is provided between the capstan and the supply reel only, the moment of inertia of the supply reel is detected and control is effected so as to make the tape tension of the supply reel side optimum based on the detected moment of inertia of the supply reel. On the other hand, when the tension detector is provided only between the capstan and the take-up reel, the moment of inertia of the take-up reel is detected and control is effected to make the tape tension of the take-up reel side optimum based on the detected moment of inertia of the take-up reel.

According to the above embodiments of this invention, without adding a new circuit to the existing circuit, the moment of inertia of the reel with the tape thereon can be detected accurately, irrespective of the type of the reel, and the characteristics of the tension control system can be made constant by adjusting the gain of the tension control system according to the tape radius and the moment of inertia of the reel with the tape thereon. Furthermore, it is possible to control the currents of the respective reels in accelerating or decelerating the tape speed, thereby reducing the variations in the tape tension.

According to this invention, it is possible to accurately detect the moments of inertia of the reels with the tape thereon irrespective of the type of the reels and perform an optimal control of the tape tension by controlling the currents of the respective reels with the gain of the tension control system kept constant. Thus, the invention provides effects of making the tape run stably with the dynamic tension variation suppressed to less than a certain value for any types of reels.

We claim:

1. A method for controlling tape tension in a tape which moves from a supply reel to a take-up reel, wherein a capstan is disposed between said supply reel and said take-up reel, comprising the steps of:
   controlling respective motors to drive the supply reel and the take-up reel and a capstan motor during a selected mode of operation to drive said capstan such that the tape is moved from said supply reel to said take-up reel at a constant speed in response to a tape speed command and with the tape tension kept at a predetermined value;
   intentionally changing the tape speed during said selected mode of operation from that indicated by said tape speed command, by a predetermined speed variation by controlling said capstan motor;
   determining a variation of at least one of tape tensions produced between said supply reel and said capstan and between said capstan and said take-up reel, said tension variation being caused by said intentional change in tape speed during a speed changing period;
   determining, from the magnitude of said at least one tension variation and said change in tape speed, a ratio of a moment of inertia of at least one of said supply reel and said take-up reel with the tape thereon to the tape radius on said one reel; and
   adjusting a gain of a tension control loop at said at least one reel according to the determined value of the ratio of the moment of inertia of said one reel with the tape thereon to the tape radius on the reel.

2. A method for controlling tape tension in a tape which moves from a supply reel to a take-up reel, wherein a capstan is disposed between said supply reel and said take-up reel, comprising the steps of:
   controlling respective motors to drive the supply reel and the take-up reel and a capstan motor during a selected mode of operation to drive said capstan such that the tape is moved from said supply reel to said take-up reel at a constant speed in response to a tape speed command and with the tape tension kept at a predetermined value;

intentionally changing the tape speed during said selected mode of operation from that indicated by said tape speed command, by a predetermined speed variation by controlling said capstan motor;

determining the magnitude of a first tension variation of the tape between said supply reel and said capstan and a second tension variation of the tape between said capstan and said take-up reel, said tension variations being caused by said intentional change in tape speed during a speed changing period;

determining, from the magnitudes of said first and second tape tension variations and said change in tape speed, a first ratio of a moment of inertia of said supply reel with the tape thereon to the tape radius on said supply reel and a second ratio of a moment of inertia of said take-up reel with the tape thereon to the tape radius on said take-up reel; and correcting currents supplied to reel motors according to said first and second ratios.

3. A method for controlling the tape tension in a tape moving between supply and take-up reels, in an apparatus having a supply reel, a supply reel motor to drive said supply reel, a take-up reel, a take-up reel motor to drive said take-up reel, a capstan disposed in the middle of the tape running path between said supply reel and said take-up reel, for feeding the tape to said take-up reel, a capstan motor to drive said capstan, a first tension detecting means for detecting a physical quantity corresponding to the tension of the tape between said supply reel and said capstan, a second tension detecting means for detecting a physical quantity corresponding to the tension of the tape between said capstan and said take-up reel, a first tension control system to control said supply reel so as to eliminate a difference between a tape tension obtained by said first tension detecting means and a first target tension, and a second tension control system to control said take-up reel motor so as to eliminate a difference between a tape tension obtained by said second tension detecting means and a second target tension, comprising the steps of:

controlling respective motors to drive the supply reel and the take-up reel and a capstan motor during a selected mode of operation to drive said capstan such that the tape is moved from said supply reel to said take-up reel at a constant speed in response to a tape speed command and with the tape tension kept at a predetermined value;

intentionally changing the tape speed during said selected mode of operation from that indicated by said tape speed command, by a predetermined speed variation by controlling said capstan motor;

determining the magnitude of a first tension variation of the tape between said supply reel and said capstan, caused by a change in the tape speed, and the magnitude of a second tension variation of the tape between said capstan and said take-up reel, caused by a change in the tape speed, according to the change in tape speed, detected by said first and second tension detecting means during a tape speed changing period;

determining a ratio of moment of inertia of said supply reel with the tape thereon and a ratio of moment of inertia of said take-up reel from the magnitudes of said first and second tension variations and said change in speed tape;

adjusting a gain of said first tension control system from the determined ratio of a moment of inertia of said supply reel to the tape radius on said supply reel; and adjusting a gain of said second tension control system from the determined ratio of a moment of inertia of said take-up reel to the tape radius on said take-up reel.

4. A method for controlling the tension of a tape which is running from a supply reel to a take-up reel in an apparatus having a capstan between said supply reel and said take-up reel, comprising the steps of:

controlling respective motors to drive the supply reel and the take-up reel and a capstan motor during a selected mode of operation to drive said capstan such that the tape is moved from said supply reel to said take-up reel at a constant speed in response to a tape speed command and with the tape tension kept at a predetermined value;

determining a speed difference between a tape speed indicated by a tape speed command and an actual tape speed;

changing a speed of the tape intentionally during said selected mode of operation by a predetermined speed variation by controlling said capstan motor independently of said tape speed command when the speed difference is greater than a predetermined value;

determining a first tape tension variation between said supply reel and said capstan and a second tape tension variation between said capstan and said take-up reel, both caused by a change in the tape speed during a tape speed changing period;

determining a first ratio of a moment of inertia of said supply reel with the tape thereon and a second ratio of a moment of inertia of said take-up reel with the tape thereon from said first and second tension variations and said change in tape speed;

determining a speed difference between a tape speed after said change of tape speed and a tape speed command value and finding a tape acceleration of the tape during said tape speed changing period when said speed difference is greater than a predetermined value;

determining correction currents supplied to said reel motors from said first and second ratios and said tape acceleration;

changing the speed of the tape by controlling said capstan motor and supplying said correction currents to said two reel motors during said tape speed changing period;

determining a third tape tension variation between said supply reel and said capstan and a fourth tape tension variation between said capstan and said take-up reel, both caused by a change in the tape speed during said tape tension changing period; and correcting the first and second ratios using said third and fourth tape tension variations.

5. A method for controlling the tension of a tape which is running from a supply reel to a take-up reel in an apparatus having a capstan between a supply reel and a take-up reel, comprising the steps of:

controlling respective motors to drive the supply reel and the take-up reel and a capstan motor during a selected mode of operation to drive said capstan such that the tape is moved from said supply reel to said take-up reel at a constant speed in response to a tape speed command and with the tape tension kept at a predetermined value;

intentionally changing the tape speed during said selected mode of operation from that indicated by said tape speed command, by a predetermined speed variation by controlling said capstan motor;

determining a first tape tension variation between said supply reel and said capstan and a second tape tension variation between said capstan and said take-up reel, both caused by a change in the tape speed during said tape speed changing period;

determining a first ratio of a moment of inertia of said supply reel to the tape radius on said supply reel and a second ratio of a moment of inertia of said take-up reel to the tape radius on said take-up reel from said two variations and said change in tape speed;

detecting tape radii of tape portions wound on said two reels;

determining moments of inertia of the tape portions wound on said two reels from said two tape radii;

determining moments of inertia of the two reels with the tape thereon, respectively, from said first and second ratios;

determining moments of inertia of the empty reels from said respective moments of inertia of the reels with the tape thereon and said respective moments of inertia of the tape portions on the reels;

detecting the tape radii on the reels which vary every moment thereafter as the tape runs;

determining moments of inertia of the reels with the tape thereon from said two tape radii and said two moments of inertia of the empty reels; and adjusting gains of the two tension control loops from said two moments of inertia of the reels with the tape thereon and said two tape radii.

6. A method for controlling the tension of a tape which is running from a supply reel to a take-up reel in an apparatus having a capstan between a supply reel and a take-up reel, comprising the steps of:

controlling respective motors to drive the supply reel and the take-up reel and a capstan motor during a selected mode of operation to drive said capstan such that the tape is moved from said supply reel to said take-up reel at a constant speed in response to a tape speed command and with the tape tension kept at a predetermined value;

intentionally changing the tape speed during said selected mode of operation from that indicated by said tape speed command, by a predetermined speed variation by controlling said capstan motor;

determining a first tape tension variation between said supply reel and said capstan and a second tape tension variation between said capstan and said take-up reel, both caused by a change in the tape speed during said tape speed changing period;

determining a first ratio of a moment of inertia of said supply reel to the tape radius on said supply reel and a second ratio of a moment of inertia of said take-up reel to the tape radius on said take-up reel from said first and second tape tension variations and said change in tape speed;

detecting tape radii of tape portions wound on said two reels;

determining moments of inertia of the tape portions wound on said two reels from said two tape radii;

determining moments of inertia of the two reels with the tape thereon, respectively, from said first and second ratios and the tape radii of the tape portions;

determining moments of inertia of the empty reels from said respective moments of inertia of the reels with the tape thereon and said respective moments of inertia of the tape portions on the reels;

detecting the tape radii on the reels which vary every moment thereafter as the tape runs;

determining moments of inertia of the reels with the tape thereon from said tape radii and said respective moments of inertia of the empty reels; and correcting currents supplied to said reel motors according to said respective moments of inertia of the reels with the tape thereon and said tape radii on the reels.

7. In a tape tension control apparatus including a capstan to transport the tape, a motor to drive said capstan, a capstan speed control section to control the motor to drive said capstan, a tape supply reel, a motor to drive said tape supply reel, a tape take-up reel, a motor to drive said take-up reel, a tape speed detecting means for detecting the speed of the tape fed by said capstan, tension detecting means for detecting first and second tape tensions, respectively, on the supply side and the take-up side, tape radius detecting means for detecting tape radii on said tape supply reel and said tape take-up reel, and a reel control section to control rotating speeds of said tape supply reel and said tape take-up reel through the control of the tape supply reel drive motor and the tape take-up reel drive motor and control said first and second tape tension, wherein said control of the reel rotating speed and the tape tensions is performed according to detection signals from said detecting means, the improvement comprising:

means controlling respective motors to drive the supply reel and the take-up reel and the capstan motor during a selected mode of operation to drive said capstan such that the tape is moved from said supply reel to said take-up reel at a constant speed in response to a tape speed command and with the tape tension kept at a predetermined value;

means for detecting variations of said first and second tape tensions by use of said tape tension detecting means when a tape feed speed by said capstan is changed intentionally during said selected mode of operation from that indicated by said tape speed command by a predetermined speed variation by varying the capstan rotating speed;

means for calculating a first moment of inertia of said supply reel with the tape mounted thereon and a second moment of inertia of said take-up reel with the tape mounted thereon on the basis of the detected variations of said first and second tape tensions, the change of the tape feed speed and the detection signals from said tape radius detecting means; and gain adjusting means for adjusting gains in control of said first and second tape tensions by said reel control section according to said first and second moments of inertia and the tape radii detected by said tape radius detecting means.

8. A tape tension control apparatus claimed in claim 7, further comprising the steps of calculating third and fourth moments of inertia of the empty supply and take-up reels from said calculated first and second moments of inertia and the tape radii of the tape portions on the reels detected by said tape radius detecting means, and after said third and fourth moments of inertia have been calculated, using, in said gain adjusting step, a sum of each of said third and fourth moments of inertia and a moment of inertia of the tape portion on the associated reel determined from the tape radius of the tape portion in place of each of said first and second moments of inertia.

* * * * *